Aug. 10, 1937.   H. BECKER   2,089,330
MOTION PICTURE FILM CASSETTE
Filed April 3, 1937

INVENTOR
Helmut Becker
BY
Ivan E. A. Kingsburg
ATTORNEY

Patented Aug. 10, 1937

2,089,330

UNITED STATES PATENT OFFICE 2,089,330

MOTION PICTURE FILM CASSETTE

Helmut Becker, Wetzlar, Germany, assignor to Ernst Leitz, G. m. b. H., Wetzlar, Germany Application April 3, 1937, Serial No. 134,710
In Germany April 29, 1936

5 Claims. (Cl. 242—71)

This invention relates to film cassettes for moving picture cameras in which the film is exposed twice lengthwise so as to take two series of pictures lengthwise of the film side by side. The film is contained within the cassette and is unwound from a supply spool and wound up upon a second spool to which power is applied from the camera driving shaft. For the purposes of proper operation and in order to prevent the film from being torn away from the supply spool at the end of the exposures of the one half of the film it is necessary to provide the cassette with some means for stopping the operation of the winding up spool when the film on the supply spool has been unwound to a certain predetermined minimum extent. Such stopping means have heretofore been arranged within the camera and operatively connected with cooperating means within the cassette. This construction makes the camera more expensive and has the disadvantage that the rotation of the spools cannot be continued when the cassette is detached. Furthermore, such an arrangement, which includes stopping means operable from both the camera and the cassette, includes the disadvantage that when the two parts are coupled together, rewinding for any purpose, for instance, for taking overlapping exposures, cannot be done.

Figure 1:
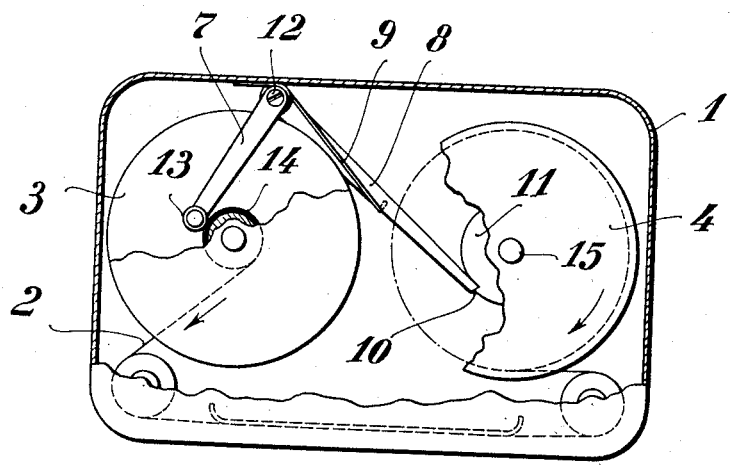

The object of this invention is to provide stopping means located wholly within the camera. Another object is to arrange the stopping means so that rewinding of the film for taking overlapping pictures is possible. Accordingly the invention is embodied in a stopping mechanism for film cassettes arranged and constructed as hereinafter set forth and as illustrated in the accompanying drawing in which Fig. 1 is a view of the cassette with parts removed and broken away to expose the interior.

Figure 2:
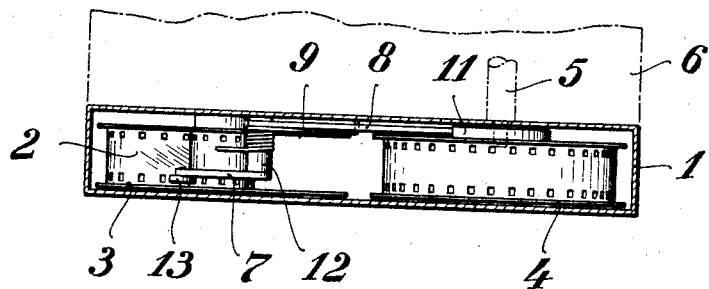

Fig. 2 is a cross sectional view taken immediately below the top plate in Fig. 1.

In the drawing the film cassette is marked 1 and the film 2. The supply spool for the first run is marked 3 and the winding up spool 4. 5 denotes the driving shaft of a camera 6. In the cassette there is pivoted on a stud 12 a bell crank having two arms 7 and 8 in fixed relation to each other. A spring 9 urges a roller 13 on the arm 7 into contact with the roll of film 14 upon the spool 3. Upon the shaft 15 of the other spool 4 there is secured a cam 11 having a tooth 10.

The operation is as follows: When the supply spool is fully wound with unexposed film, the roller 13 lies upon the outside of the roll of film on the supply spool 3 as will be understood. Thereafter the cassette is attached to the camera and the driving shaft 5 in the camera then engages the winding up spool shaft 15 in a known manner.

When the camera starts to operate the film is unwound from the spool 3 and wound up upon the spool 4. The roller 13 follows the decreasing supply of the film until, as shown in Fig. 1 the bell crank has been swung so far inward with respect to the two spool shafts that the end of the arm 8 hits the tooth 10 and thereby stops rotation of the spool 4 before the film is wholly unwound from the spool 3. The cassette may now be detached, turned around and then the spool 3 coupled to the camera shaft 5 whereupon the film may be unwound from the spool 4 and wound back upon the spool 3. Inasmuch as the direction of rotation of the spool 4 is then opposite to that indicated in the drawing, the cam tooth 10 offers no obstruction to the movement of the bell crank. It will be noted that inasmuch as the stop member 7—8 prevents unwinding of the film from the supply spool before the end of the film has been reached, the film cannot be torn away from the spool 3 which therefore immediately serves as a winding up spool when the cassette is reversed with relation to the camera. It will also be noted that the winding of the film may be stopped by stopping the camera at any time and a portion of the film wound back upon the spool 3 for purposes of taking overlapping pictures.

I claim:—

1. A film cassette containing motion picture film for taking two series of exposures lengthwise side by side including a film supply spool, a film winding up spool, a device within the cassette under the control of the supply of film upon the supply spool for engaging the winding up spool to stop rotation of the latter when the supply of film upon the supply spool has been unwound to a predetermined extent and means for keeping said device in operative contacting relation with the film upon the supply spool.

2. A film cassette containing motion picture film for taking two series of exposures lengthwise side by side including a film supply spool, a film winding up spool, a cam rotating with the latter, an arm for engaging said cam to stop rotation of the winding up spool, a second arm controlling the operation of the said first arm in response to the amount of film upon the supply roll and a spring for keeping said second arm in yielding operative contacting relation with the roll of film upon the supply spool.

3. A film cassette containing motion picture film for taking two series of exposures lengthwise side by side including a film supply spool, a film winding up spool, a cam secured to the latter, a bell crank having two arms pivoted within the cassette, one of said arms being adapted to engage the said cam to stop rotation of the winding up spool, the other of said arms resting upon the roll of film on the supply spool and a spring for yieldingly keeping the second bell crank arm in operative contacting relation with the roll of film on the supply spool.

4. A film cassette containing motion picture film for taking two series of exposures lengthwise side by side including a film supply spool, a film winding up spool, a cam rotating with the latter, a bell crank having two arms pivoted within the cassette, one of said arms being adapted to engage said cam to stop the rotation of the winding up spool, the other of said arms resting upon the roll of film on the supply spool and a spring constantly urging both of said arms in a direction towards the shafts of the said two spools whereby when the supply of film upon the supply spool has been reduced to a predetermined extent the rotation of the winding up spool will be stopped by said first bell crank arm engaging the said cam.

5. A film cassette containing motion picture film for taking two series of exposures lengthwise side by side including a film supply spool, a film winding up spool, a cam rotating with the latter, a pair of arms in fixed relation to each other pivoted within the cassette, a spring for maintaining the first arm in contact with the roll of film on the supply spool and for moving the other arm into contact with the said cam to stop the rotation of the winding up spool when the roll of film on the supply spool has been unwound to a predetermined extent, the said cam having stopping action with relation to said second arm in only one rotative direction of the winding up spool whereby the operation of said spools may be reversed independent of operation of said cam.

HELMUT BECKER.